United States Patent
Calabro et al.

(10) Patent No.: US 7,509,054 B2
(45) Date of Patent: Mar. 24, 2009

(54) METHOD FOR THE TRANSMISSION OF OPTICAL POLARIZATION MULTIPLEX SIGNALS

(75) Inventors: Stefano Calabro, München (DE); Erich Gottwald, Holzkirchen (DE); Nancy Hecker, München (DE); Georg Sebald, München (DE); Bernhard Spinnler, München (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 566 days.

(21) Appl. No.: 10/528,313

(22) PCT Filed: Aug. 13, 2003

(86) PCT No.: PCT/EP03/08997

§ 371 (c)(1),
(2), (4) Date: Mar. 17, 2005

(87) PCT Pub. No.: WO2004/028046

PCT Pub. Date: Apr. 1, 2004

(65) Prior Publication Data

US 2005/0286904 A1    Dec. 29, 2005

(30) Foreign Application Priority Data

Sep. 17, 2002    (DE) ................................ 102 43 141

(51) Int. Cl.
*H04B 10/00* (2006.01)

(52) U.S. Cl. .................. 398/152; 398/150; 398/184

(58) Field of Classification Search .................. 398/65, 398/85, 150–152, 183–184
See application file for complete search history.

(56) References Cited

U.S. PATENT DOCUMENTS

| 5,008,958 | A   |   | 4/1991  | Cimini, Jr. et al. |
| 6,681,082 | B1  | * | 1/2004  | Tanaka et al. ................ 398/158 |
| 6,782,211 | B1  |   | 8/2004  | Core |
| 6,909,851 | B2  | * | 6/2005  | Ishikawa ..................... 398/147 |
| 2002/0186435 | A1 | * | 12/2002 | Shpantzer et al. ........... 359/136 |

FOREIGN PATENT DOCUMENTS

| EP | 0 445 943 A2 | 9/1991 |
| EP | 0 564 167 A2 | 10/1993 |

* cited by examiner

*Primary Examiner*—Dzung D Tran
(74) *Attorney, Agent, or Firm*—Bell, Boyd & Lloyd LLP

(57) ABSTRACT

Binary signals are converted at the transmission end into two optical signals which are combined into a polarization multiplex signal and are then transmitted. The transmitted polarization multiplex signal is divided at the receiving end into two polarized signal parts which are converted in a linear manner into orthogonal electrical components and are supplied to a multidimensional filter. Said multidimensional filter replaces a polarization controller, restores the signal values that correspond to the signals at the transmission end, and compensates signal distortions.

17 Claims, 9 Drawing Sheets

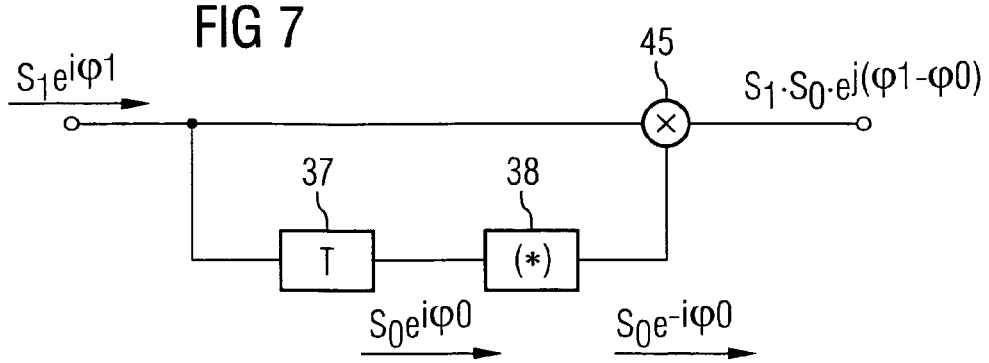
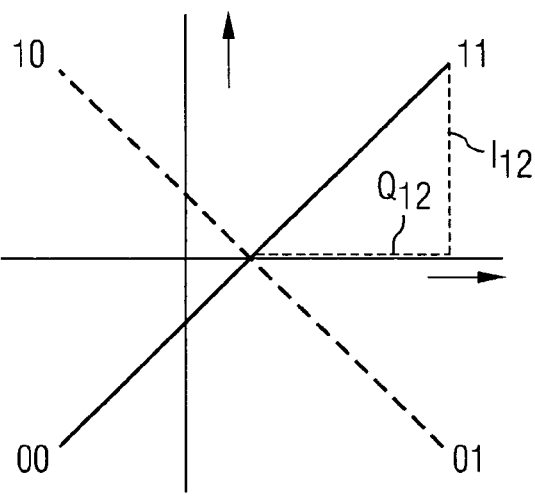
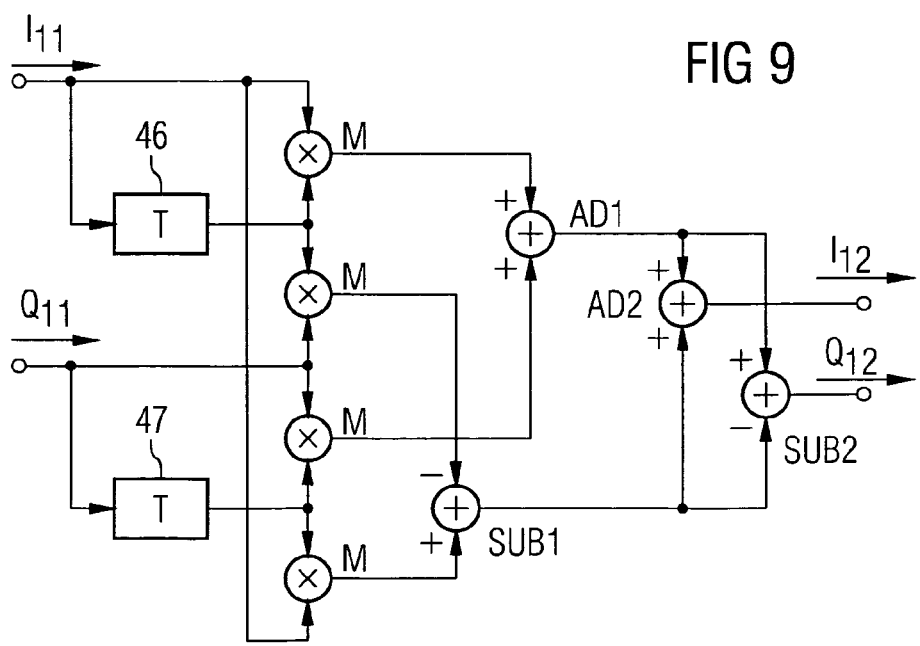

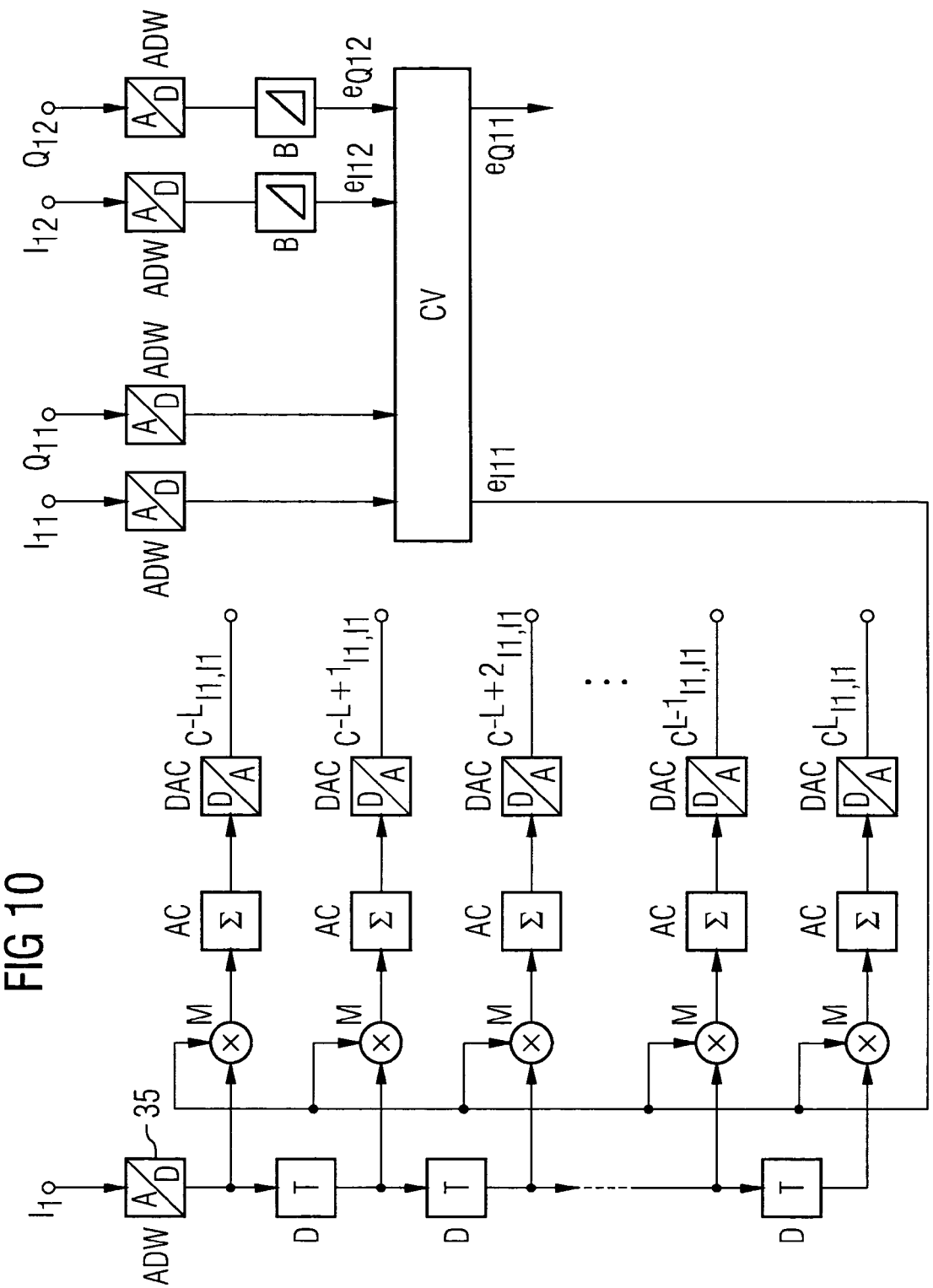

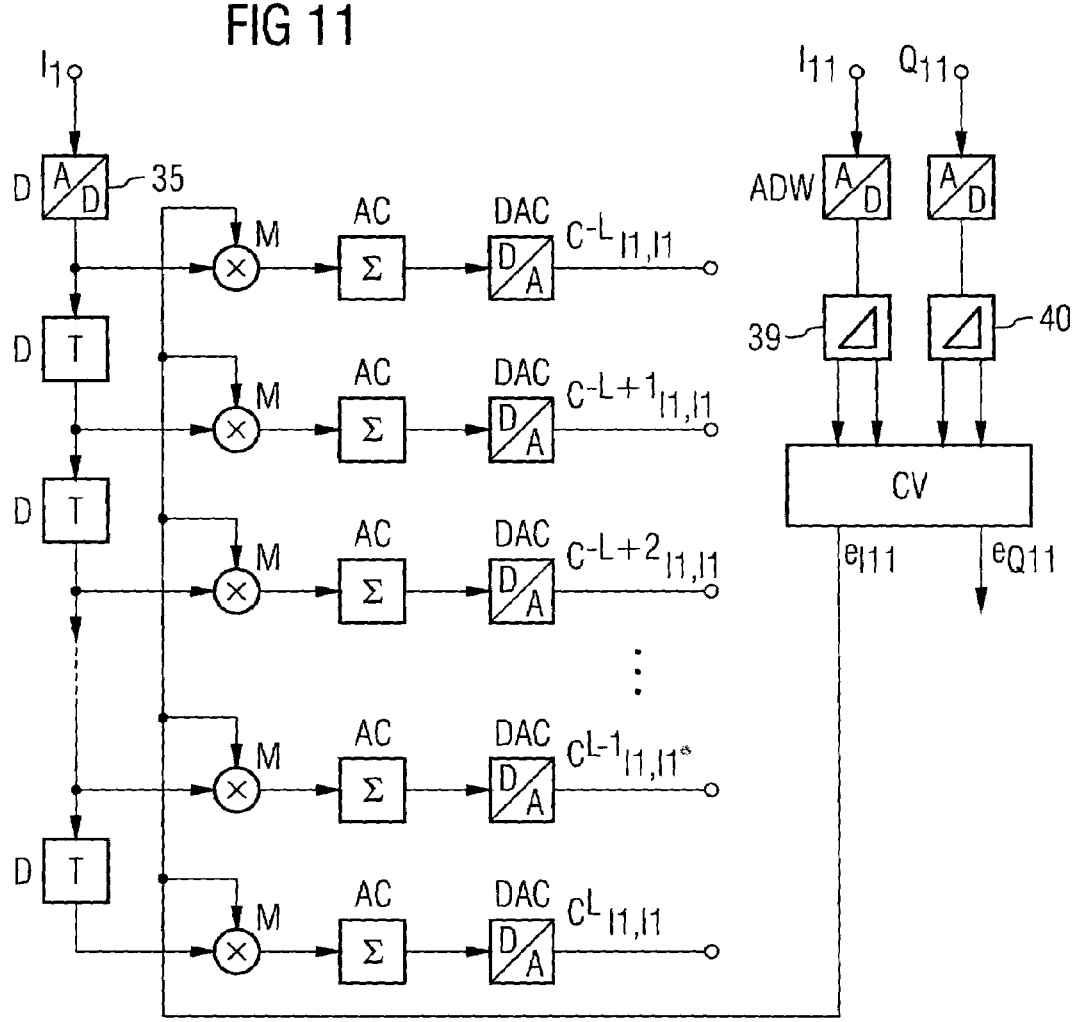

METHOD FOR THE TRANSMISSION OF OPTICAL POLARIZATION MULTIPLEX SIGNALS

CROSS REFERENCE TO RELATED APPLICATIONS

This application is the US National Stage of International Application No. PCT/EP2003/008997, filed Aug. 13, 2003 and claims the benefit thereof. The International Application claims the benefits of German application No. 10243141.8 filed Sep. 17, 2002, both applications are incorporated by reference herein in their entirety.

FIELD OF THE INVENTION

The invention relates to a method for transmitting optical polarization multiplex signals.

BACKGROUND OF THE INVENTION

Bit rates of 10 Gbit/s per channel are customary today for optical wavelength multiplex systems. Forty-Gbit/s systems have also been developed and implemented as models, but these systems are very demanding in terms of expenditure. Particular problems give rise therein to distortions in the transmitted signals such as polarization mode dispersion (PMD) and chromatic dispersion. Polarization controllers and optical compensation devices are used to compensate said distortions.

Numerous modulation and encoding methods are known from the communications field and numerous possibilities have been investigated to find suitable methods leading to a significant improvement in the transmission characteristics of optical systems.

In "telcom report" 1/88, pages 22 to 25, a radio relay system is described that transmits orthogonally polarized signals by means of suitable antennas. Imperfect technical equipment such as poorly oriented antennas as well as reflections give rise to cross-polarization faults where one signal overlaps another actually orthogonal signal in a disruptive manner. The polarized signals are split at the receiving end by separate antennas. Adaptive time-domain equalizers are provided for eliminating cross-polarization faults. The basic concept of depolarization compensation is to obtain a compensation signal and add it to the respective main signal. No frequency errors must occur and any inter-signal time displacements must be compensated. The change in polarization occurring in a radio relay system is, however, slight compared to optical transmission over fibers. Any polarization can occur here.

An arrangement and a method for transmitting polarization multiplex signals are described in the publication of an unexamined application reference DE 101 56 244 A1. A differential phase modulation is applied at the transmitting end between the orthogonally polarized transmission signals. Said modulation serves to control a common polarization transformer, or to control separate polarization transformers for each transmission channel, by evaluating interferences. The purpose thereof is to maximize the control rate with a minimal expenditure requirement. The polarization transformer can be embodied for compensating (lacuna). The transmission link is for this purpose simulated with the aid of a double-refracting crystal and employing numerous control voltages as being "inverse", so that the pulse mode dispersion is compensated. The measures taken at the transmitting end are frequently undesirable for reasons of transparency; moreover, both fast and reliable PMD controlling in the optical range remains demanding in terms of expenditure.

SUMMARY OF THE INVENTION

The object of the invention is to achieve an increase in transmission capacity during optical data transmission, with said increase being unattended by increased bandwidth requirements for optical and electrical system components, and also to further reduce the expenditure requirements.

Said object is achieved by the claims.

Advantageous developments are indicated in the dependent claims.

The combining of four-stage multiphase modulation and polarization multiplex transmission while employing the same bandwidth and an insignificantly increased signal-to-noise ratio in particular enables the data rate to be quadrupled. Two mutually orthogonally polarized multiphase signals are transmitted, as a result of which minimal cross-influencing is ensured. Mutual influencing is further minimized through synchronous transmission of the orthogonal multiphase signals. Sensitivity to PMD and chromatic dispersion remains the same with respect to known systems having a lower data rate, or it increases only slightly.

The compensating of disruptive effects is here subject practically to the requirements of a conventional system having a quarter the data rate.

The use of a four-stage differential phase modulation has proved to be especially advantageous. Complex coherent demodulation is not necessary here.

The system can of course also be used to transmit a multiplicity of data signals at a lower data rate in parallel. Synchronous transmission is advantageous when the data rates are the same since the polarized signals will influence each other least.

A major advantage of the invention ensues from a specific embodiment of the method at the receiving end or, as the case may be, of the receiver. There is no further need here for a polarization controller. A major constituent of the receiver is now a multidimensional filter rendering the polarization controller superfluous and additionally enabling compensation of the signal distortions.

In the case of a multidimensional electrical filter the orthogonally polarized signal parts have to be converted into complex electrical signals in a linear manner. PMD and chromatic dispersion can thus likewise be compensated at the electrical level.

No coherent demodulation is necessary when differential multiphase modulation is employed. An advantageous embodiment of the demodulators enables data bits to be fed out in parallel.

Major parts of the receiver, including the multidimensional filter and the demodulators, can be embodied digitally depending on the available circuit technology.

A control for determining the filter coefficients is already embodied digitally.

Exemplary embodiments of the invention are explained in more detail with the aid of figures.

BRIEF DESCRIPTION OF THE DRAWINGS

FIG. 7 is a circuit schematic of a demodulator, FIG. 8 is a diagram for elucidating the functioning mode, FIG. 9 is a circuit schematic of a demodulator that processes signal components, FIG. 10 shows a first arrangement for determining the filter coefficients, FIG. 11 shows a second arrangement for determining the filter coefficients.

DETAILED DESCRIPTION OF THE INVENTION

Figure 1:
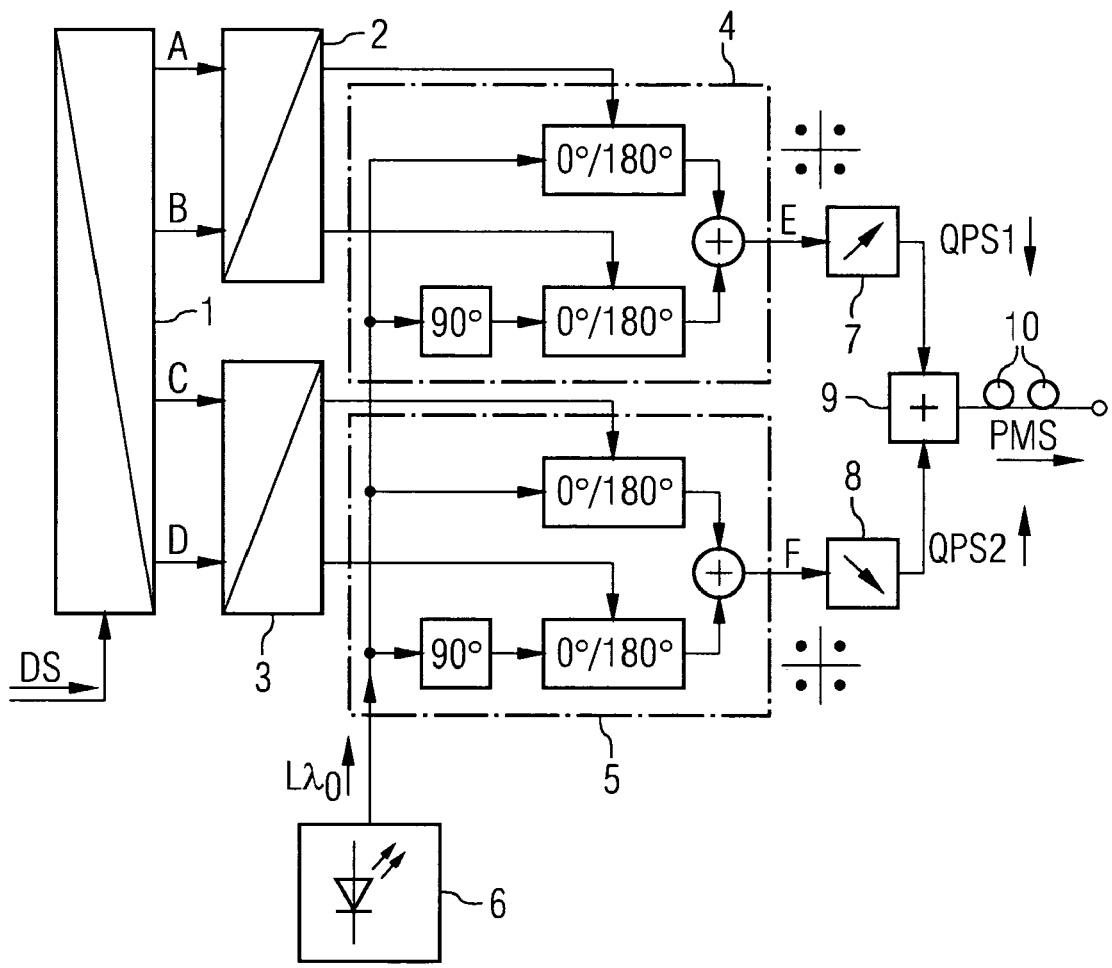
FIG. 1 shows the transmitting part of a transmission system for implementing the invention.

FIG. 1 shows an exemplary embodiment of the transmitting part of a transmission system for implementing the method according to the invention.

A data signal DS is converted in a serial-to-parallel converter 1 into four parallel binary signals A, B, C, and D. Four synchronous data streams can also be transmitted. In each case two data streams A, B and C, D are routed to a DQPSK (Differential Quadrature Phase-Shift Keying) precoder 2 or, as the case may be, 3. Said precoder takes account of the preceding and current bit pair and converts the differences between said bit pairs into four possible phase changes of 0, 90, 180, and 270°. The modulators 4 and 5 only indicate possible exemplary embodiments. Its top branch, which generates a phase angle of 0 or 180°, and the bottom branch, with which a phase angle of 90 or 270° is set, are activated in each modulator for generating a multiphase signal (QDPSK signal) E. This results in phase angles of 45°, 135°, 225°, and 315°. An analogous procedure is applied to the data streams C and D, which are converted in the bottom modulator 5 into the QDPSK signal F. Two polarization controllers 7 and 8 ensure that an output signal QPS1 of a modulator 4 is polarized (at least approximately) orthogonally to the output signal QPS2 of the other modulator 5. The thus polarized multiphase signals QPS1 and QPS2 are combined in a polarization beam combiner 9 into a polarization multiplex signal PMS, which is transmitted over a transmission fiber 10.

Figure 2:
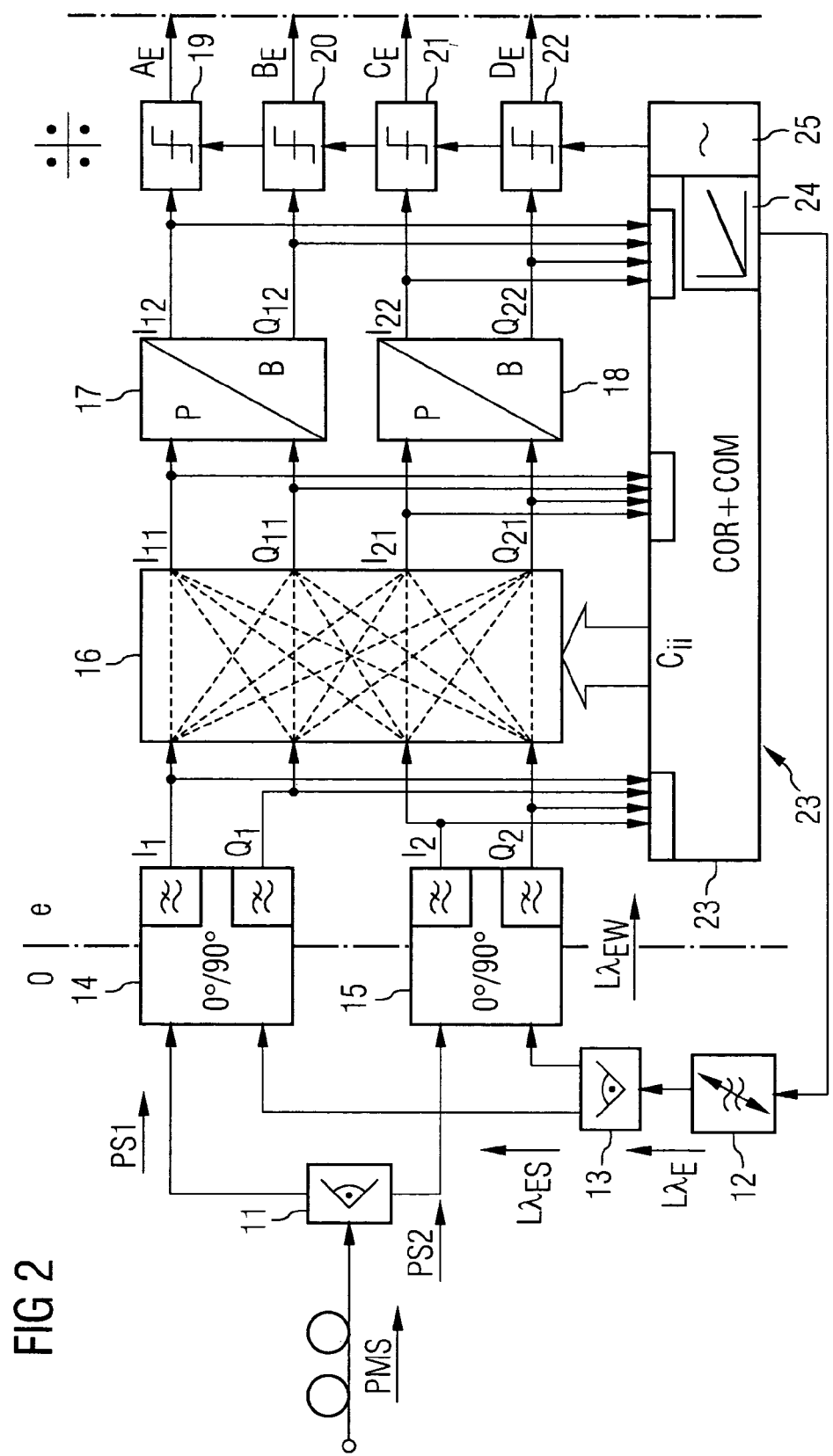
FIG. 2 shows a receiving part according to the invention.

FIG. 2 is the circuit schematic of a receiving part for implementing the method according to the invention.

The basic functioning of the entire receiving part will first be briefly described below. The individual elements will then, where necessary, be described in more detail.

The received polarization multiplex signal PMS is routed to a polarization divider 11 which divides it into two orthogonally polarized signal parts PS1 and PS2. The first polarized signal part PS1 is routed to a first optoelectric converter 14; the second polarized signal part PS2 is routed to an identically designed second optoelectric converter 15.

The polarized signal parts PS1 and PS2 are each converted into orthogonal components $I_1$, $Q_1$ or, as the case may be, $I_2$, $Q_2$ and routed to a multidimensional filter 16. Said filter recombines portions of the polarized components into reconstructed signals $I_{11}+jQ_{11}$ or, as the case may be, $I_{21}+jQ_{21}$ corresponding to the optical signals QPS1; QPS2. The reconstructed signals $I_{11}+jQ_{11}$ or, as the case may be, $I_{21}+jQ_{21}$ are demodulated in the demodulators 17 and 18 using their orthogonal signal components $I_{11}$, $Q_{11}$ or, as the case may be, $I_{21}$, $Q_{21}$ and converted back in decision stages 19-22 into binary signals $A_E$, $B_E$, $C_E$, and $D_E$ at the receiving end. A control 23 controls the filter 16 and the generation of the clock signals required at the receiving end.

No polarization controller is provided according to FIG. 2 for dividing the received polarization multiplex signal PMS. However, as a consequence of this the polarization at the input of the polarization divider 11 is of any kind, and the first polarized signal part PS1 will only tally with the first multiphase signal QPS1 in a very rare special instance in which the second polarized signal part PS2 also tallies with the second multiphase signal QPS2. Signal parts PS1 and PS2 will mostly contain portions of both multiphase signals QPS1 and QPS2, which will then be routed to both the top optoelectric converter 14 and the bottom optoelectric converter 15.

Optical or electrical signals can as a basic rule be processed at the receiving end. Digitizing and digital processing is likewise also possible downstream of the converters.

Figure 3:
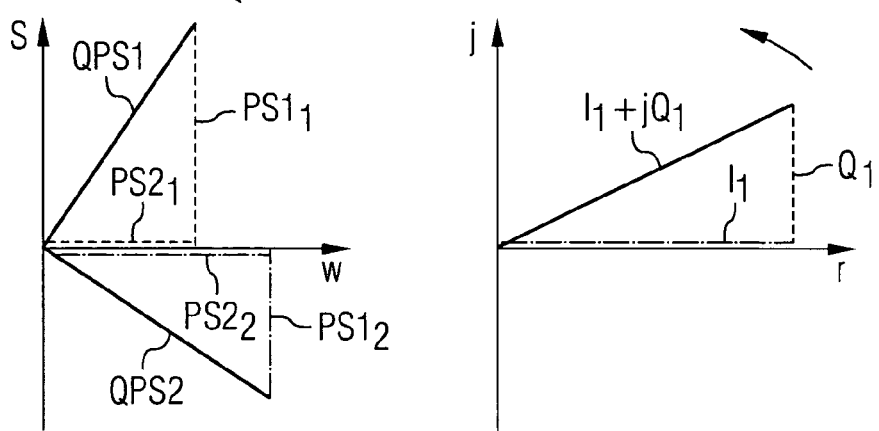
FIG. 3 is a diagram elucidating the functioning of the receiving part.

In its left-hand section, the diagram in FIG. 3 shows signals at the input and outputs of the polarization divider 11. The polarization planes are designated s, standing in German for vertical, and w, standing in German for horizontal. When polarization is of any kind, the polarization multiplex signal PMS is applied with its two orthogonally polarized multiphase signals QPS1 and QPS2 to the input of the polarization divider. Each signal QPS1 and QPS2 is divided by the polarization divider 11 in each case into a first "vertical" signal portion $PS1_1$ and into a second "horizontal" signal portion $QS1_1$ or, as the case may be, $PS1_2$ and $QS1_2$. The vertical components form the polarized signal part PS1 and the horizontal components form the polarized signal part PS2. Each signal part therefore contains portions of both multiphase signals QPS1 and QPS2. The "vertically" polarized signal part PS1 is applied to the input of the top optoelectric converter 14 and the "horizontally" polarized signal part PS2 is applied to the input of the bottom optoelectric converter 15 (FIG. 2).

The basic function of said optoelectric (o/e) converter is to convert the polarized partial signals linearly into a complex electrical signal. The implemented converters each feed out two orthogonal components $I_1$ and $Q_1$ or, as the case may be, $1_2$ and $Q_2$ (Q: imaginary part for a complex representation). The orthogonal components can be further processed more simply. The "complex" output signal $I_1+jQ_1$ of the optoelectric converter 14 is shown in the right-hand section of FIG. 3 (r=real, j=imaginary axis).

A transformation to the baseband of the carrier-modulating signal takes place to practical advantage at the same time as conversion to an electrical signal. Expressed another way: The optical signal is transformed linearly from the optical range into the complex baseband level; immediately ensuing electrical signal processing is then equivalent to a processing of the optical signal. A signal $L\lambda_E$ of a carrier-frequency generator (laser) at the receiving end is employed for conversion.

Figure 4:
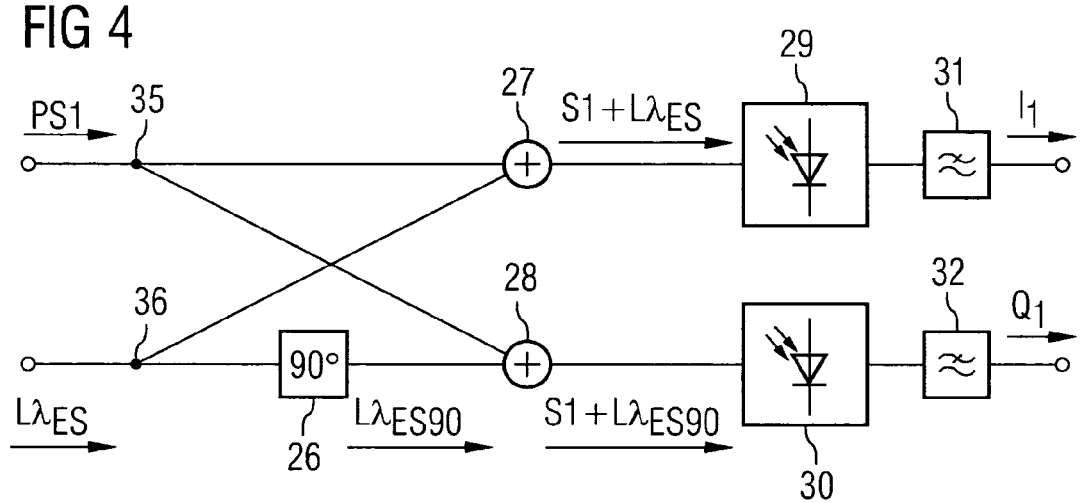
FIG. 4 is a circuit schematic of an optoelectric converter.

FIG. 4 shows an instance of an optoelectric converter 14, 15. Apart from the polarized signal part PS1 or, as the case may be, PS2, a similarly polarized carrier-frequency signal $L\lambda_{ES}$ or, as the case may be, $L\lambda_{EW}$ from the receiving end having in this exemplary embodiment at least approximately the frequency of the carrier signal $L\lambda_0$ is routed to each converter for optoelectric conversion. Each converter contains splitters 35, 36 for splitting the input signals, a phase-shifting element 26, two adders 27, 28, photodiodes 29, 30, and low passes 31, 32.

If one considers the top converter 14, the polarized signal part PS1 is routed as the input signal to both adders 27 and 28 via the splitter. The laser signal $L\lambda_{ES}$ is likewise split into two partial signals, with one part thereof being added in the first adder 27 directly to the signal PS1. In contrast to this, a signal $L\lambda_{ES90}$ phase-shifted by 90° is added in the second adder 28.

The summation signals are each converted by the photodiodes into electrical signals, corresponding to a squaring according to formula (1):

$$(S1+L\lambda_{ES})^2 = S_1^2 + 2S1 \times L\lambda_{ES} + (L\lambda_{ES})^2 \quad (1)$$

The signals S1 and $L\lambda_{0ES}$ or, as the case may be, $L\lambda_{ES90}$ are given in their general form in the equations $$S1 = A(t)\sin(\omega_0 t + \phi_A(t)) \text{ and} \quad (2)$$

$$L\lambda_{ES} = B(t)\sin(\omega_E t + \phi_{ES}(t)) \text{ or, as the case may be,} \quad (3)$$

$$L\lambda_{ES90} = B(t)\sin(\omega_{E90} t + \phi_{ES90}(t)) \quad (4)$$

$$(S1 + L\lambda_{ES90})^2 = S_1^2 + 2S1 \times L\lambda_{ES90} + (L\lambda_{ES90})^2. \quad (5)$$

The first and the last term of the factored out sum according to formula 1 contain high-frequency oscillations that are removed by the low pass. The middle term contains a signal portion that was transformed into a lower frequency position. Said signal portion is filtered out as an electrical component $I_1$. The bottom electrical component $Q_1$ is obtained analogously using the signal $L\lambda_{ES90}$ phase-shifted by 90°.

In the preferred exemplary embodiment the carrier-frequency signal $L\lambda_E$ at the receiving end has the frequency of the carrier so that the transformation takes place into the baseband. If only the frequency of the controlled carrier-frequency oscillator 12 is controlled and not its phase, then in the case of a finite control error there will be a change in phase between the carrier of the input signal, of the signal part PS1, and $L\lambda_{ES}$ of the optoelectric converter. There will consequently likewise be a change in phase in the complex output signal $I_1 + jQ_1$ and it will undergo a slow rotation. The amplitudes of the components $I_1$, $Q_1$ will also change accordingly. The complex output signals $I_{11} + jQ_{11}$ and $I_{21} + jQ_{21}$ of the filter will then as a result also rotate around the zero point of the complex level.

With a coherent demodulation which, it must be said, is more technically demanding and requires phase synchronism between the carrier-frequency signal and a carrier-frequency signal generated at the receiving end, the output signals $I_1$, $Q_1$ and $I_2$, $Q_2$ have an orientation that is dependent solely on the polarization. Said orientation being extensively compensated by the filter, the angles of the reconstructed signals $I_{11} + jQ_{11}$ and $I_{21} + jQ_{21}$ at the filter outputs are to a large extent constant.

Figure 5:
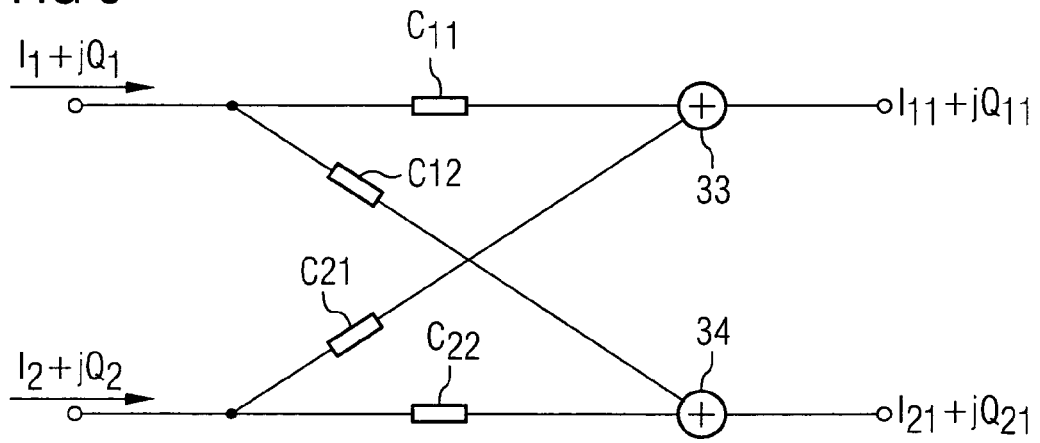
FIG. 5 is a circuit schematic of a complex filter for elucidating the functioning mode.

FIG. 5 is a simplified complex representation of the filter 16. Said filter makes it possible to multiply each input signal by a filter coefficient and switch it through to each output, with the thus generated signal portions being added. Because the polarization multiplex signal PMS can have any polarization, the polarized partial signals PS1 and PS2 contain both portions of the first multiphase signal QPS1 and of the second multiphase signal QPS2. The controllable filter 16 assumes a polarization controller's function of reconstructing the multiphase signals QPS1 and QPS2 in the electrical level from the corresponding electrical signal components $I_1$, $Q_1$ and $I_2$, $Q_2$.

Two complex signals $I_1 + jQ_1$ and $I_2 + jQ_2$ formed from the electrical signal components $I_1$, $Q_1$ and $I_2$, $Q_2$ are now being applied to the two filter inputs. The output signal $I_{11} + jQ_{11}$ corresponding to the first quadrature phase signal QPS1 and the output signal $I_{21} + jQ_{21}$ corresponding to the second quadrature multiphase signal QPS2 are reconstructed in electrical form by means of a coefficient matrix $C_{11}$, $C_{12}$, $C_{21}$, $C_{22}$ and two adders 33, 34. The reconstructed signals $I_{11} + jQ_{11}$ and $I_{21} + jQ_{21}$ rotate corresponding to the input signals of the filter.

Figure 6A:
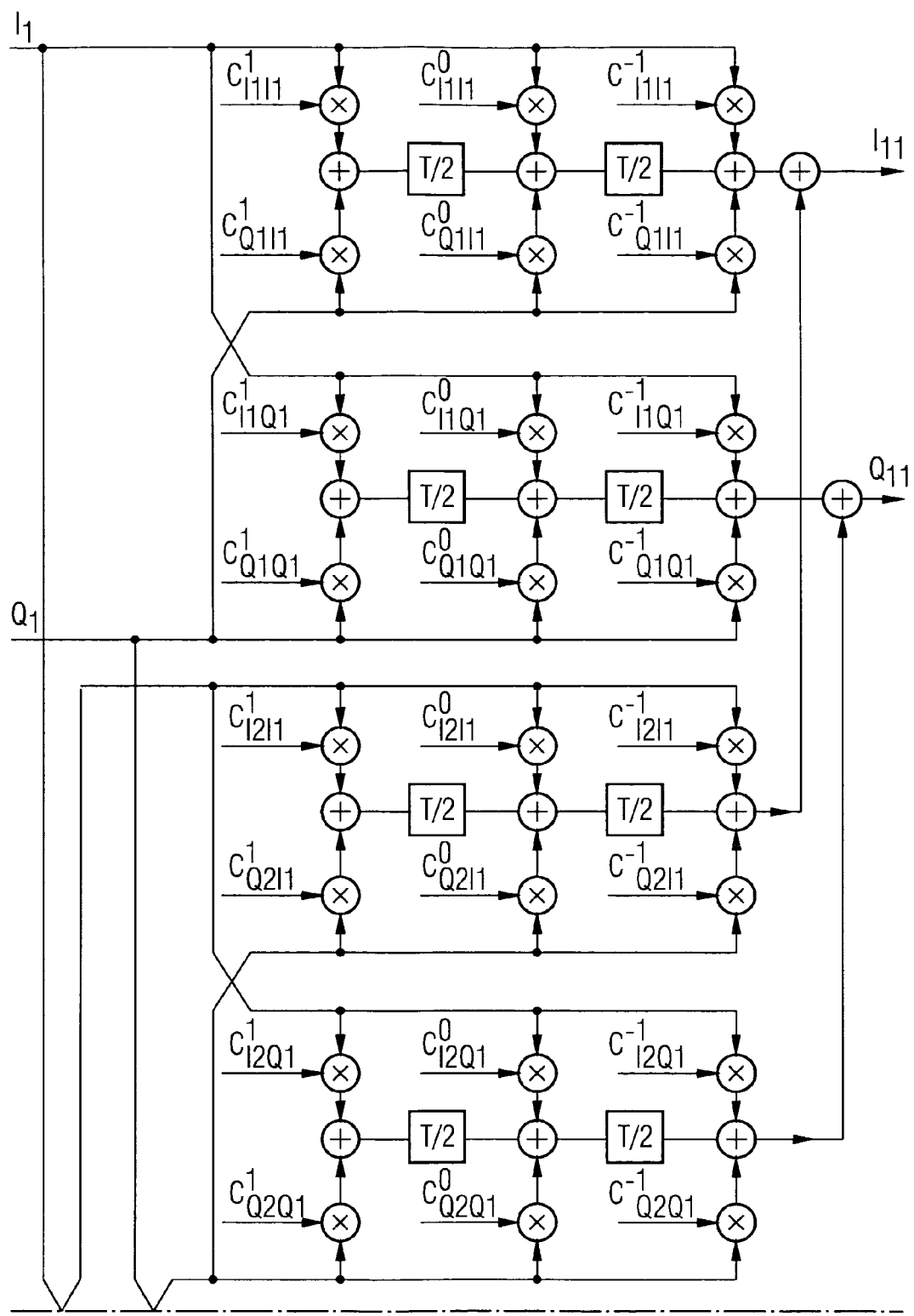
FIG. 6 is a circuit schematic of a four-dimensional filter.
Figure 6B:
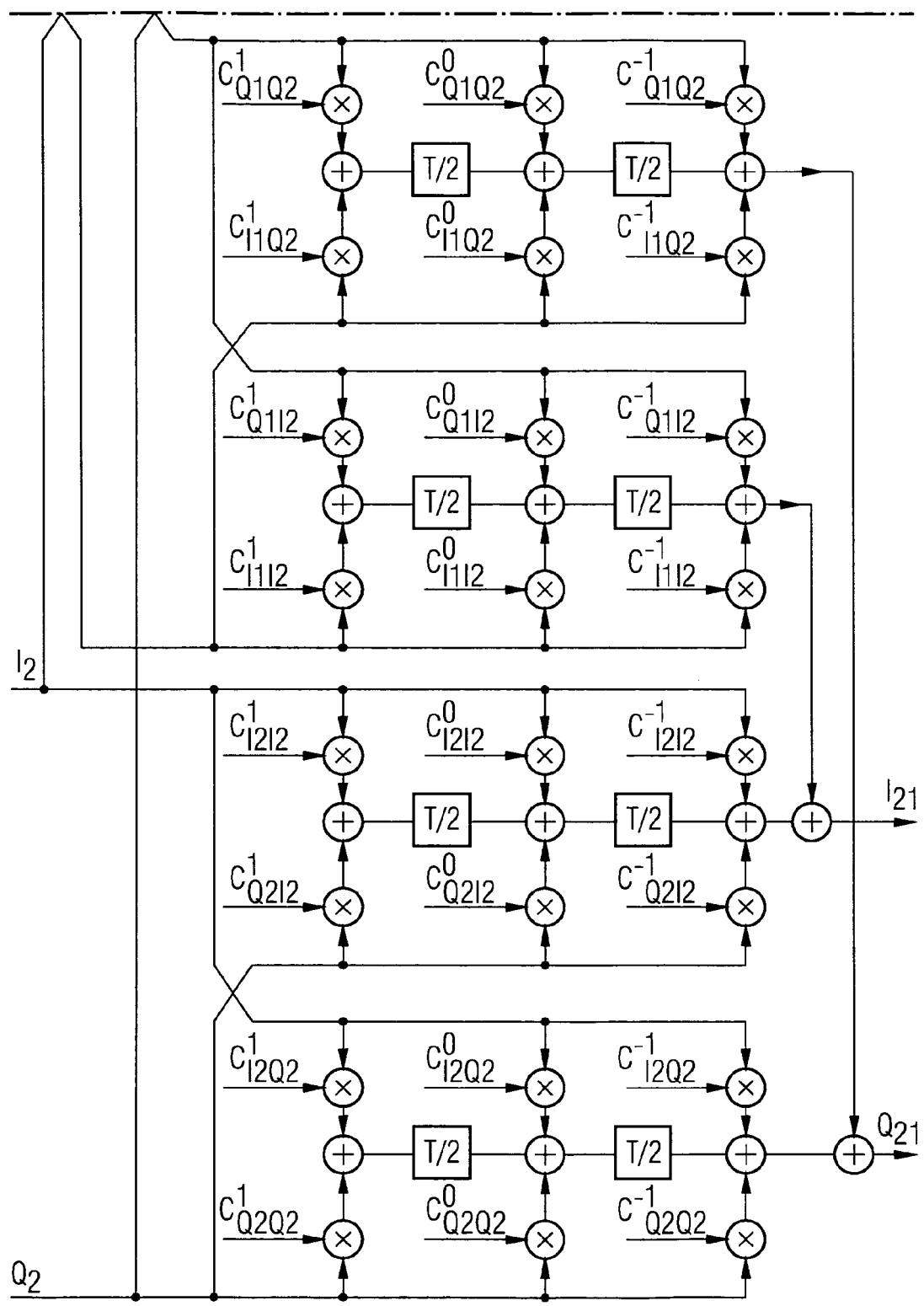

FIG. 6 is a circuit schematic of a transversal filter 16 for processing orthogonal electrical components by means of which filter the multiphase signals QPS1 and QPS2 are to be reconstructed in the electrical level. The electrical components $I_1$, $Q_1$ or, as the case may be, $I_2$, $Q_2$ are routed to the multidimensional filter 16. Since in each case four signal components are to be processed and fed out, this is a four-dimensional filter having four inputs and four outputs.

The physical design of the filter allows all input signals to be multiplied by any filter coefficients and additively switched through to each of the four outputs. Asynchronous multiphase signals can also be processed thanks to the fractional spacing used.

The orthogonal reconstructed signal components $I_{11}$, $Q_{11}$ or, as the case may be, $I_{21}$, $Q_{21}$ fed out at the output of the filter 16 correspond in each case, apart from the optoelectric conversion and a rotation, to the quadrature phase signals QPS1 or, as the case may be, QPS2.

A further advantage of the invention ensues from the linear conversion of the optical signals. Optimal correction can be carried out just as in the optical range. Chromatic dispersion and polarization mode dispersion can be extensively compensated given a filter 16 of suitable physical design or a filter connected downstream thereof. The compensation can be performed using the measuring and control methods that are already known but which will not be dealt with in further detail here.

The reconstructed signal $I_{11} + jQ_{11}$ or, as the case may be, its orthogonal signal components $I_{11}$, $Q_{11}$ is/are routed to the first demodulator 17, while the reconstructed signal components $I_{21}$, $Q_{21}$ are routed to the second demodulator 18.

FIG. 7 is a simplified circuit schematic of a complex demodulator. This contains a delay element 37 and a computation circuit 38 connected in series therewith for forming the complex conjugate value, and further contains a multiplier 45. Demodulation is based on the principle of vector-multiplying two sequential symbols.

The demodulator multiplies in each case the current signal value $S_1 e^{j\Phi 1}(=I_{11}+jQ_{11})$ with the preceding complex conjugate signal value $S0 e^{-j\Phi 0}$, with the product $(S_1 \times S_0)e^{j(\Phi 1 - \Phi 0)}$ of the amplitudes and the difference between the phase values being obtained as the result. The phase values can vary between 0 and 270° but ideally assume the values 0°, 90°, 180°, 270°. The result is rotated through 45° by being multiplied by (1+j) so that a separation into orthogonal components can be performed better. The individual components are then in each case assigned one bit determined in each case by one of the separate threshold comparators 19-22.

The diagram in FIG. 8 shows the positions of the demodulated signal for different bit combinations A, B. A current bit combination "11" is indicated by unbroken lines, the other bit combinations 10, 01, 00 are indicated by dashed lines. It can be seen that the thresholds of the decision stages 19-22 coincide with the axis intersection.

Each of these demodulators thus supplies results that are independent of the position of the input signals, with the slow rotation of the input signals being negligible. Each demodulator already supplies components $I_{12}$, $Q_{12}$ or, as the case may be, $I_{22}$ and $Q_{22}$ of the demodulated signals $I_{12} + jQ_{12}$ or, as the case may be, $I_{22} + jQ_{22}$. In each case two orthogonal signal components correspond to a bit combination.

FIG. 9 is a circuit schematic of the demodulator 17 for processing orthogonal components $I_{11}$ or, as the case may be, $Q_{11}$, which are routed to its inputs. The necessary mathematical operations are performed for the real and imaginary signal portion of the current and preceding orthogonal components in accordance with the representation. Two delay elements 46 and 47 store the preceding signal components. When the components have been multiplied in the multipliers M, summation values are formed by the adders AD1 and AD2 and difference values are formed by the subtractors SUB1 and SUB2 in order to obtain the components $I_{12}$ and $Q_{12}$ of the demodulated signal.

It is furthermore also possible to obtain information for clock regeneration.

According to FIG. 2 the decision stages 19-22 directly enable conversion of the demodulated signal components $I_{12}$, $Q_{12}$, $I_{22}$, $Q_{22}$ into binary signals $A_E$, $B_E$, $C_E$, and $D_E$ at the receiving end corresponding to the binary signals A, B, C, D at the transmitting end.

The control 23 (COR: correlation; COM: compensation) is provided for ascertaining and setting the filter coefficients. Said control also has a carrier-frequency controller 24 which controls the carrier-frequency oscillator 12 at the receiving end. It furthermore has a decision-clock regenerator 25.

Various methods known per se can be employed to ascertain the coefficients. The adaptation algorithm can be based on the orthogonal signal components $I_{11}$, $Q_{11}$; $I_{21}$, $Q_{21}$ and/or on the demodulated signal components $I_{12}$, $Q_{12}$; $I_{22}$, $Q_{22}$. The known expectation values are used as the basis in order to determine any departures from said expectation values, namely the errors. Said errors are minimized by varying the filter coefficients.

FIG. 10 shows an arrangement for obtaining the filter coefficients based on the minimum mean-square error (MMSE). Said digitally operating arrangement first converts the analog signal components $I_1$, $Q_1$, $I_2$, $Q_2$, $I_{11}$, $Q_{11}$, $I_{21}$, $Q_{21}$ into digital signals by means of analog-to-digital converters ADW. However, for simplification purposes all that is shown is the filter part between the input of the filter to which the orthogonal components $I_1$, are applied and the output at which the reconstructed signal components $I_{11}$ are fed out.

The orthogonal component $I_1$ is delayed several times by delay elements D in accordance with the delay elements of the multidimensional filter 16. Each output of the delay elements D is linked in each case to a multiplier M. An error signal $e_{I11}$ is routed to the second inputs of the multipliers.

Said error signal and that of the associated orthogonal component can be ascertained from error signals $e_{I12}$ and $e_{Q12}$ of the demodulated signal components. The errors $e_{I12}$ and $je_{Q12}$ are first ascertained in evaluation circuits B by comparing should-be and as-is values of the demodulated signal components $I_{12}$, $Q_{12}$ (or, as the case may be, $I_{22}$, $Q_{22}$). However, the errors of the orthogonal signal component $I_{11}$, $Q_{11}$ or, as the case may be, $I_{21}$, $Q_{21}$ are required for controlling the coefficients. Said errors are obtained by taking the multiplication performed in the modulator and rescinding it in a computation circuit CU using the preceding complex conjugate signal value, which is to say by repeating multiplication using the preceding signal value. This produces the following equation for the error of the signal components $I_{11}$, $Q_{11}$ or, as the case may be, $I_{21}$, $Q_{21}$:

$$e_{I11} + je_{Q11} = (e_{I12} + je_{Q12})(I_{11} + jQ_{11}) \quad (6)$$

The following is obtained from this for the errors of the orthogonal signal components:

$$e_{I11} + je_{Q11} = e_{I12}I_{11} - e_{Q12}Q_{11} + j(e_{Q12}I_{11} + e_{I12}Q_{11}). \quad (7)$$

Split into the real part (I) and imaginary part (Q), the equations for the derotator are as follows $$e_{I11} = I_{11}e_{I12} - Q_{11}e_{Q12} \quad (8)$$

$$e_{Q11} = I_{11}e_{Q12} + Q_{11}e_{I12} \quad (9)$$

The 45° rotation does not need to be taken into account in these considerations. The errors are multiplied in the multipliers M by the delayed signal values and integrated in accumulators before they determine the coefficients $C_{ii}$, where applicable after digital-to-analog conversion (in digital-to-analog converters).

FIG. 11 shows a variant for obtaining the filter coefficients which is referred to as a blind MMSE algorithm. The arrangement here differs from the representation in FIG. 10 solely through obtaining of the error signals. In this case, too, for simplification purposes all that is shown is the filter part between the input of the filter to which the orthogonal components $I_1$ are applied and the output at which the reconstructed signal components $I_{11}$ are fed out.

The error signals $e_{I11}$ and $e_{Q11}$ etc. for optimizing the filter coefficients are obtained by means of pseudo decision elements 39, 40, which use the reconstructed signal values $I_{11}$, $Q_{11}$; $I_{21}$, $Q_{21}$ directly.

Suitable start conditions are essential for each adaptation algorithm. Such conditions can be provided by specific bit combinations or signal encoding sent on startup of operation or during transmission.

Figure 12:
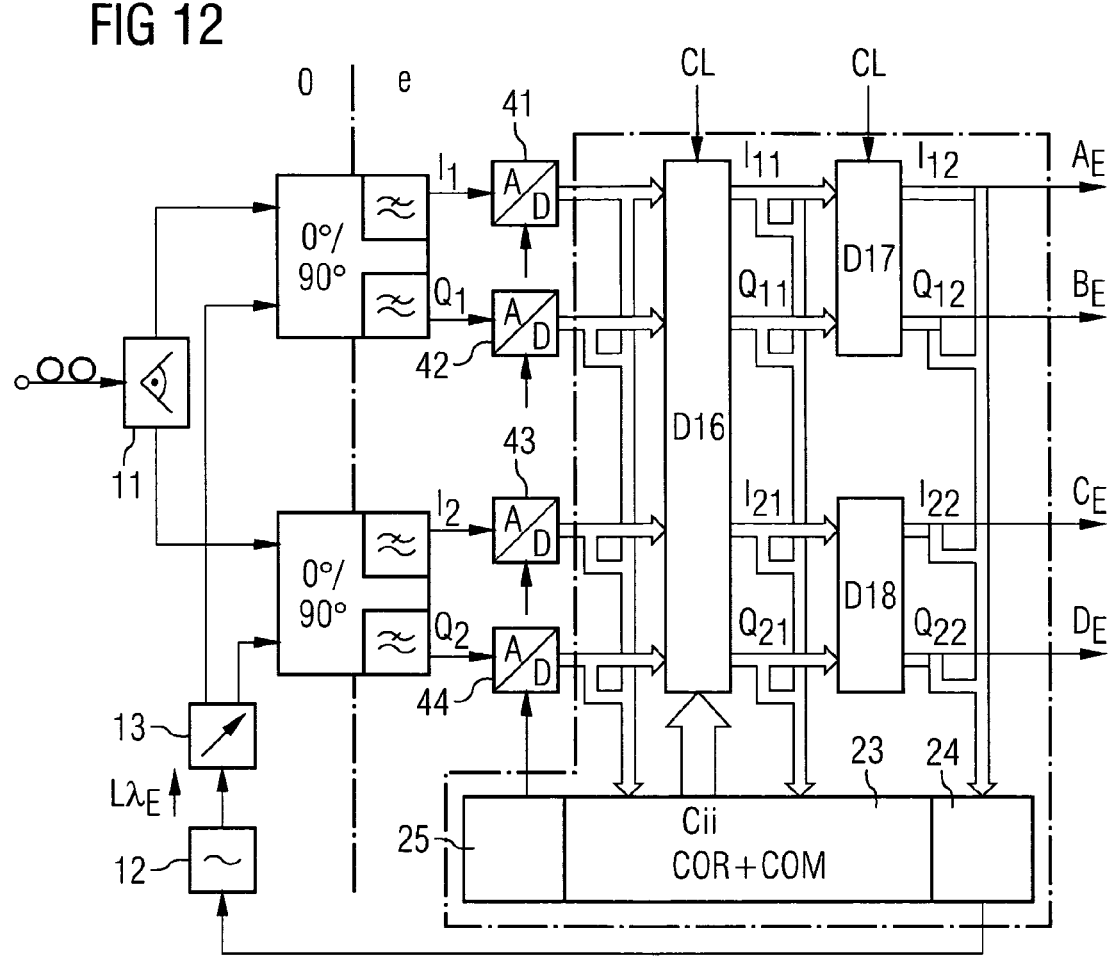
FIG. 12 shows an extensively digitized receiving part.

FIG. 12 shows a variant having an extensively digitally operating receiving part. Conversion by the optoelectric converters 14 and 15 is immediately followed by analog-to-digital conversion by means of the analog-to-digital converters 41-44. Further signal processing is carried out digitally with the aid of a clock signal CL. The filter 16 and the demodulators have been replaced by digitally operating circuits D16, D17, D18. Owing to the high data rates, this implementation is not yet economical, however.

The controllable filter 16 can also be embodied as an optical filter. It would be ideal if the converters were likewise embodied purely optically and fed out an amplitude-modulated optical signal.

Over and above its functions already described, the control is able to ascertain the signal quality. Numerous methods are known for this based, for example, on different decision thresholds for producing amplitude histograms. An error-correcting device can also supply relevant information. Poor signal quality is frequently due to signal distortions, such as chromatic dispersion and polarization mode dispersion, caused by the transmission fibers. Optoelectric signal conversion having taken place in a linear manner, equivalent electrical compensation can be carried out as well. This is also done through coefficient controlling of the filter 16.

Additional attention is here drawn to the fact that a suitably adapted receiving part can also be employed in connection with other types of modulation.

The invention claimed is:

1. A method for transmitting optical polarization multiplex signals, the method comprising:
    converting a first binary signal into a first optical signal;
    converting a second binary signal into a second optical signal polarized orthogonally to the first optical signal;
    combining the orthogonally polarized optical signals into a polarization multiplex signal;
    transmitting the polarization multiplex signal;
    dividing the polarization multiplex signal at the receiving end into two orthogonally polarized signal parts;
    converting each polarized signal part in a linear manner into a complex signal;
    feeding the complex signals to a multidimensional filter whose coefficients are controlled in such a way that signals which have been reconstructed independently of the polarization of the received polarization multiplex signal and which correspond to the optical signals are fed out at the filter outputs, and
    demodulating and converting the reconstructed signals into binary signals at the receiving end, wherein a data signal is converted by a serial-to-parallel conversion into a multiplicity of binary signals, the data signal having a higher rate than a multiplicity of binary signals.

2. The method according to claim 1, wherein
each polarized signal part is converted linearly into a complex electrical signal having two orthogonal components, and wherein
its orthogonal components are fed to the controllable multidimensional filter which, from said orthogonal components, obtains the reconstructed signals in the form of reconstructed signal components.

3. The method according to claim 2, wherein the polarized signal parts are converted into the complex signals or into the orthogonal components of the baseband.

4. The method according to claim 2, wherein the binary signals are converted into optical multiphase signals.

5. The method according to claim 2, wherein two binary signals are converted by a four-stage differential phase modulation into multiphase signals.

6. The method according to claim 1, wherein the binary signals are converted into optical multiphase signals.

7. The method according to claim 6, wherein with the application of four-phase modulation or four-stage differential phase modulation, demodulated signal components are generated by demodulating the reconstructed signals or their signal components, and wherein
the signal components of the demodulated signals are evaluated by threshold comparators and converted into binary signals at the receiving end.

8. The method according to claim 1, wherein the first and second binary signals are converted by a four-stage differential phase modulation into an optical multiphase signal comprising the first and second optical signals.

9. The method according to claim 8, wherein with the application of four-stage differential phase modulation, demodulating is carried out by vector-multiplying sequential reconstructed signal values or, as the case may be, their signal components, and wherein
the demodulated signal values are rotated through 45° or a multiple thereof, and wherein
the associated signal components are converted by threshold comparators into binary signals at the receiving end.

10. The method according to claim 8, wherein the filter coefficients of the multidimensional filter are obtained from errors of the demodulated signals.

11. The method according to claim 8, wherein the filter coefficients of the multidimensional filter are obtained from errors of the decoded signals.

12. The method according to claim 1, wherein the optical signals are transmitted phase synchronously.

13. The method according to claim 1, further comprising:
measuring the signal quality; and
compensating signal distortions in the complex signals and/or reconstructed signals.

14. The method according to claim 1, wherein signal distortions are compensated by controlling the filter coefficients of the filter.

15. The method according to claim 1, wherein the orthogonal components, having been digitized, are processed in a controllable digital filter to obtain the reconstructed signals.

16. The method according to claim 1, wherein the orthogonal components are processed as optical signals in a controllable optical filter to obtain optical reconstructed signals.

17. A method for transmitting optical polarization multiplex signals, the method comprising:
converting at least a first binary signal into a first optical signal; and
converting at least a second binary signal into a second optical signal polarized orthogonally thereto and the orthogonally polarized optical signals are then combined into a polarization multiplex signal and thereupon transmitted, wherein
the polarization multiplex signal is divided at the receiving end into two orthogonally polarized signal parts, wherein
each polarized signal part is converted in a linear manner into a complex signal, wherein
the complex signals are routed to a multidimensional filter whose coefficients are controlled in such a way that signals which have been reconstructed independently of the polarization of the received polarization multiplex signal and which correspond to the optical signals are fed out at the filter outputs, and
that the reconstructed signals are demodulated and converted into binary signals at the receiving end, wherein a data signal is converted by a serial-to-parallel conversion into a multiplicity of binary signals, the data signal having a higher rate than the multiplicity of binary signals.

* * * * *